June 29, 1965 W. E. MEISSNER ETAL 3,191,360
APPARATUS FOR ADHESIVELY BONDING SURFACES
Original Filed April 10, 1961 2 Sheets-Sheet 1

June 29, 1965   W. E. MEISSNER ETAL   3,191,360
APPARATUS FOR ADHESIVELY BONDING SURFACES
Original Filed April 10, 1961   2 Sheets-Sheet 2

United States Patent Office 3,191,360
Patented June 29, 1965

3,191,360
APPARATUS FOR ADHESIVELY BONDING
SURFACES
William E. Meissner, Devon, Pa., and Gardiner Lane, Darien, Conn.; said Meissner assignor, by mesne assignments, to FMC Corporation, San Jose, Calif., a corporation of Delaware
Original application Apr. 10, 1961, Ser. No. 101,986, now Patent No. 3,151,427. Divided and this application Aug. 16, 1962, Ser. No. 217,406
12 Claims. (Cl. 53—383)

This application is a division of application Serial No. 101,986, filed April 10, 1961, now U.S. Patent 3,151,427.

The invention relates to an improved apparatus for adhesively bonding surfaces to each other.

In adhesively bonding either planar surfaces, as for example in laminating or package-sealing operations, or contoured or irregular surfaces, an adhesive is applied to one or more surfaces to be bonded by a brush, spatula, transfer roll, spraying device or by actually dipping one or more of such surfaces in the adhesive itself. These conventional modes of adhesive application do not provide the necessary assurance that an even and continuous distribution of adhesive will be applied to all areas of the surfaces to be coated, especially after extended use when drying of the adhesive and clogging of the applicator is often encountered. Accordingly, a primary object of this invention is to provide a generally new or improved and more satisfactory apparatus for applying adhesives to surfaces to be bonded, and particularly an apparatus which is suited for continuous bonding operations.

Another object is the provision of an improved apparatus for applying an adhesive, to one or more surfaces to be joined, in the form of a mass of bubbles of tacky film-forming material.

Still another object is the provision of an apparatus for adhesively bonding surfaces to each other wherein a mass of bubbles of tacky film-forming material is disposed between the surfaces to be joined and then placed under pressure to distort and ultimately rupture the bubbles and provide a substantially uniform and unbroken layer of tacky film-forming material.

A still further and more specific object is to provide an apparatus for adhesively sealing conventional valve bags after filling thereof.

These and other objects and advantages of the invention will become apparent from the following description and accompanying drawing in which.

Figure 1:
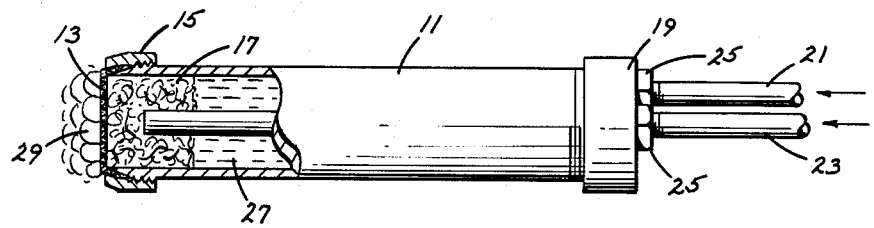
FIGURE 1 is a side view of one embodiment of the apparatus of the present invention, with a portion thereof being broken away.

In general, the present invention relates to adhesively bonding surfaces to each other by a mass of bubbles of tacky film-forming material wherein the applied bubbles of adhesive material are distorted and ruptured to provide a generally uniform and unbroken adhesive layer as the surfaces are pressed together. Broadly, the apparatus of the present invention includes means for providing a tacky film-forming material, means for dispersing the tacky film-forming material into a plurality of individual masses, and means for inflating such masses to provide a plurality of adhesive bubbles.

In a more specific arrangement, apparatus for dispersing and inflating tacky film-forming material into a plurality of adhesive bubbles is incorporated into a filling spout of a valve bag packaging machine for applying a layer of adhesive bubbles to an adjacent surface of a bag valve after the bag filling operation is completed. As the bag valve is urged into a closed position, as for example by movement of the bag contents thereagainst, the adhesive bubbles of the applied layer are distorted and ultimately ruptured to thus seal the bag valve in closed position with a generally uniform and unbroken layer of tacky film-forming material. In accordance with the present invention, adhesive bonding of surfaces can be satisfactorily achieved by employing a single and relatively large inflated mass of tacky film-forming material. A preferred procedure, however, is to effect bonding by using a plurality of small bubbles of tacky film-forming material which are adapted to more readily enter into any folds or pleats in the surfaces being bonded and thus provide greater assurance of the formation of an unbroken adhesive layer as such bubbles are collapsed.

A wide variety of film-forming materials which are of a tacky or adhesive character when rendered plastic or flowable may be employed in the practice of the present invention. Preferred types include the synthetic linear polymers of thermoplastic character and the elastomeric types. Examples include vinyl resins, such as polyvinyl acetate, copolymers of vinyl chloride and vinyl acetate, copolymers of acrylonitrile and vinyl acetate, polyacrylonitrile and copolymers of acrylonitrile with vinyl chloride, vinyl acetate, methacrylonitrile, and so forth, polyethylene, linear superpolymers of the polyester of nylon (polyamide) type, polyvinyl butyral, polyvinyl alcohols, polyvinyl ethers; elastomeric types may include neoprene, polymers of chloroprene, copolymers of butadiene with styrene or acrylonitrile, polyisobutylene, and so forth. It is to be understood that the mentioning of these particular materials is not intended to limit the invention thereto but merely to illustrate the wide variety of film-forming materials that can be used in carrying out the invention.

The film-forming material may be converted into a flowable condition by fusion or by the incorporation of plasticizers or solvents capable of dissolving or dispersing the material. Thus, any of the thermoplastic materials may be heated to fusion after which the inflating medium may be introduced therein, preferably at the same temperature as the fused material. If necessary, the temperature of fusion may be lowered by the incorporation of a plasticizer either of solid or liquid character. When plasticizers or solvents are incorporated into the plastic material, the plasticizer or solvent is preferably non-reactive with the inflating medium. The cooling of the fused plastic mass, with or without plasticizers, is effected as the expanded bubbles of film-forming material are distorted and ruptured to provide a continuous lining or coating along the adjacent surfaces being joined.

Volatile solvents may be employed for dissolving or dispersing the film-forming material so that a mass thereof may be formed at room temperature and expanded, with the setting or coagulation of the expanded bubble or bubbles, after application to the surfaces being sealed, occurring by volatilization of the solvent. Known solvents and plasticizers may be employed, the selection depending upon the particular film-forming material to be used. Thus, acetone or dioxane may be used for vinyl acetate or copolymers of vinyl acetate or vinyl chloride or acrylonitrile. The concentration of the film-forming material, when a solution thereof is used, is preferably as great as possible and is limited only by the necessity that the plastic mass be capable of expanding under the pressure of the inflating medium, yet be of a reasonably viscous and coherent plastic character so as to be capable of supporting its own weight.

The inflating medium may be air or other gas which is non-reactive with the film-forming material or the materials being bonded. As heretofore mentioned, the inflating medium is preferably heated when delivered into the film-forming material to prevent premature setting thereof. In sealing large surfaces, it may be further desirable to effect bonding with the surfaces themselves being heated or disposed within a heated chamber.

The teachings of the present invention are applicable to adhesively bonding surfaces of various construction which are formed of the same or different materials. With surfaces of porous or permeable construction, the adhesive bonding material may serve an added function, such as a moisture or light or gas barrier, or as a stiffener for imparting rigidity to the bonded surfaces where flexible materials are employed. Further, while the present invention is applicable to bonding of contoured or irregular surfaces, for the sake of simplicity and ease of description, the apparatus will hereafter be described as applied to adhesively bonding generally planar surfaces, such as encountered in laminating of sheet materials or bag or sack sealing operations.

For a more detailed description of the invention, reference is made initially to FIGURE 1 of the drawing which illustrates one embodiment of the apparatus of the present invention. This particular apparatus is of portable construction and preferably of a size which can be readily held by one hand of an operator and easily moved relative to a surface for applying an adhesive coating thereto. Basically, this apparatus includes a tubular housing 11, a screen 13 extending across one end of the housing and secured thereto by a collar 15, a porous plug 17 disposed within the housing 11 and retained therein by the screen 13, a cap 19 secured to the opposite end of the housing 11, and a pair of conduits 21 and 23 which extend through and are secured to the end cap 19 by nuts 25. The conduit 21 is connected to a source of tacky film-forming material, not shown, which is preferably pumped through the conduit 21 at a generally uniform rate concomitantly as the apparatus is set into operation. The discharge end of the conduit 21 is preferably spaced from the porous plug 17 and the delivery of tacky film-forming material is so regulated as to provide a small head of tacky film-forming material within the housing 11, as shown at 27. The conduit 23, on the other hand, terminates adjacent to and preferably within the plug 17 and is connected to a suitable supply of compressed gas, such as air, which is preferably but not necessarily delivered as a rapidly pulsating flow.

As heretofore mentioned, the plug 17 is of porous construction so that the tacky film-forming material 27 may flow therethrough and be broken up into relatively small masses. The plug 17 may be comprised of granular, fibrous and/or cellular materials, as for example metal particles, metal or glass wools, cellulose, plastic or rubber sponge, etc. The porosity of the plug 17 may be readily controlled, as for example by selecting particles of uniform or mixed sizes when granules are employed, by regulating the degree of compression applied to metal or glass wools, by selection of a sponge having voids of desired size, or by using the above noted materials in different combinations with each other.

In the operation of the above described apparatus, tacky film-forming material 27 delivered into the housing 11 flows through the porous plug 17 whereby it is broken into small masses. As these masses of tacky film-forming material approach the screen 13, they are subjected to compressed air or other gas issuing from the conduit 23 and are thus inflated and discharged through the screen 13 as a plurality of adhesive bubbles, as shown at 29. The portion of the porous plug 17 which extends across the end of the conduit 23 serves to effectively deflect the compressed gas discharged therefrom along different directions and thus prevents the tacky film-forming material from being sprayed from the apparatus as tiny droplets or globules. As a further precaution against such occurrence the compressed air may, if desired, be delivered as a rapidly pulsating flow. The inflation of the masses of tacky film-forming material generally occurs as the material approaches and passes through the screen 13 and thus the mesh or screen openings assist in regulating the sizes of the adhesive bubbles as they are formed.

The adhesive bubbles discharged from the apparatus described may be collected as a layer on one or more of the surfaces to be bonded. As heretofore mentioned, the relatively small size of adhesive bubbles enables the same to more readily enter into folds and other irregularities in the surfaces being joined. As the formation of a desired layer of adhesive nears completion, delivery of compressed air is continued momentarily after the supply of tacky film-forming material has been cut off. In this manner tacky film-forming material is removed from the screen 13 and the porous plug 17 adjacent thereto, and thus avoids undesired dripping therefrom. The surfaces thus coated are then pressed together causing the adhesive bubbles which are interposed therebetween to be gradually distorted into a flattened condition and ultimately ruptured. As the surfaces are pressed together it will be apparent that the small adhesive bubbles will be urged further into folds and other surface irregularities. More important, during this distortion from their original spherical configuration to a flattened condition, the adhesive bubbles will progressively line the surfaces with which they engage, and upon rupture, will provide a generally uniform and unbroken layer of tacky film-forming material between the surfaces.

The embodiment of the invention shown in FIGURES 2–6 is particularly designed for use in adhesively sealing conventional valve bags after filling thereof with granular or pulverant materials. Generally, conventional valve bag packaging apparatus, includes a filling spout which is inserted into the valve opening of an empty bag after which the material to be packaged is delivered, as for example pneumatically or by screw impeller. The bottom of the bag is normally supported by a bag chair which may be oscillated or otherwise vibrated to assist in settling the packaged material within the bag. After the bag has been filled with a predetermined amount of material, the bag is moved longitudinally off the filling spout and tilted onto its side whereby the movement of the packaged material within the bag urges the bag valve into a closed position. Since with conventional apparatus the bag valve is not actually sealed in a closed position there is a tendency for the packaged materials, and especially materials which are in a pulverant or powdered form, to escape through the bag valve as the contents are vibrated or shifted within the bag as during handling and transit.

In the drawing, only that portion of a valve bag packaging apparatus germane to the present invention has been illustrated, it being understood that the remainder of the apparatus may be of any known and conventional construction. The valve bag or sack, referred to by the character 35 in the following description, is of conventional multi-ply construction, usually formed of paper and being either sewn or adhesively bonded at its ends. One corner of the bag 35 is left unsealed during bag fabrication and is lined with a sleeve 37 of paper or like material to provide a valve through which the bag may be filled.

Figure 2:
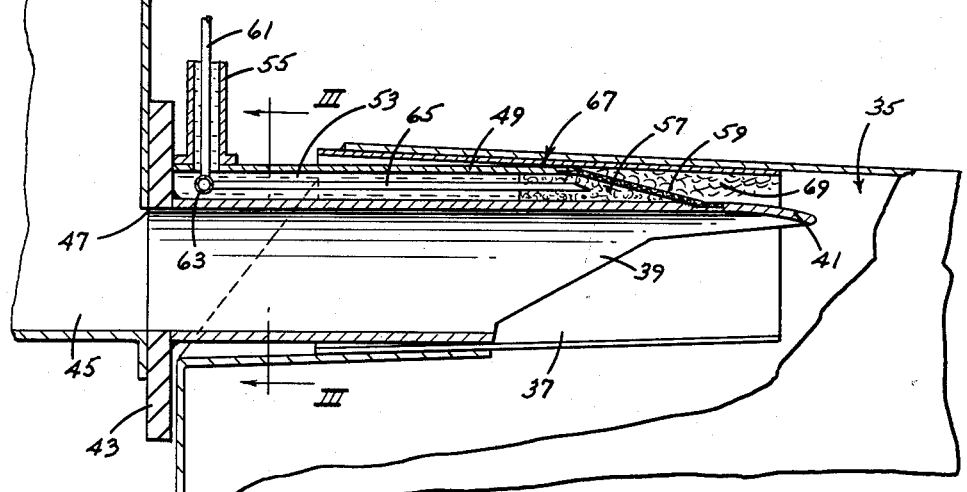
FIGURE 2 is a longitudinal vertical section through a filling spout of a valve bag packaging apparatus having incorporated therein the adhesive applicator of the present invention.
Figures 3, 4:
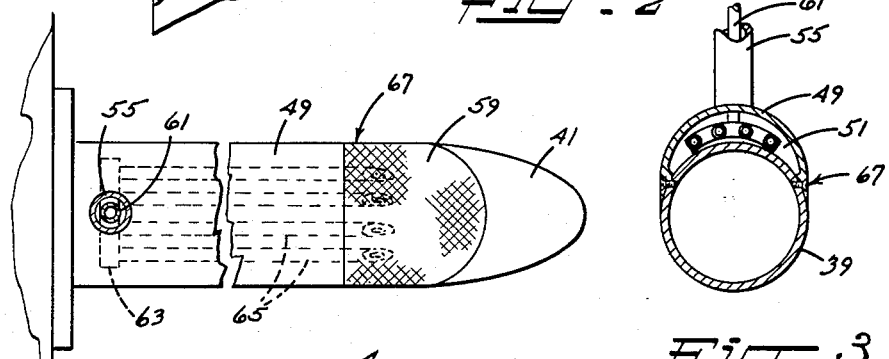
FIGURE 3 is a transverse vertical section taken substantially along the line III—III of FIGURE 2.
FIGURE 4 is a shortened top view of a portion of the apparatus shown in FIGURE 2.

With reference to FIGURE 2 of the drawing, the apparatus there disclosed includes a filling spout 39 having an overhanging lip or deflector 41 at one end. A flange 43 is formed at the opposite end of the spout 39 and is fixed to a material supply hopper 45 in alignment with a hopper discharge opening 47. As shown in FIGURE 3 an arcuate plate 49 is secured, in fluid-tight relationship, to the top portion of the spout 39 to provide a conduit 51 into which tacky film-forming material 53 is delivered by a pipe 55. A plug 57 of porous material is disposed within the open end of the conduit 51 and is retained therein by a screen 59 disposed along an inclined plane.

The pipe 55 is connected with a suitable source, not shown, of tacky film-forming material which is preferably pumped at selected predetermined intervals as more fully described hereafter. Positioned concentrically within the pipe 55 is a gas delivery conduit 61 which is connected to a source of compressed gas, not shown, and opens into a header 63. A series of spaced gas discharge pipes 65 extend from the header 63 and terminate adjacent to and preferably within the porous plug 57.

In the operation of this embodiment of the invention, an empty valve bag 35 is initially disposed on the combined filling spout and adhesive applicator, indicated by the character 67. The overhanging lip 41 of the spout 39 facilitates rapid positioning of the bag 35 and, in addition, serves to direct the material being packaged away from the bag valve. As shown in FIGURE 2, the member 67 fits rather snugly within the bag sleeve 37 and, if desired, conventional means may be provided for preventing "blow back" of the material being packaged due to back pressure within the bag itself.

The material to be packaged is delivered from the hopper 45 and through the spout 39 in a conventional manner, as for example by an impeller or by being mixed or "fluidized" with an air stream. Once the desired quantity of material is delivered into the bag 35, the filling operation is stopped after which the bag 35 is slidably removed from the member 67.

During removal of the filled bag 35 from the member 67, compressed gas, preferably air, is delivered through the series of pipes 65 and into the porous plug 57. As described with reference to the apparatus of FIGURE 1, the compressed gas serves to inflate the masses of film-forming material in the pores of the plug 17 causing a plurality of adhesive bubbles to issue from the screened opening, as shown at 69. Concomitantly with the delivery of compressed air, tacky film-forming material is pumped through the pipe 55 and into the conduit 51 to maintain the plug 57 in a generally saturated condition.

Figure 5:
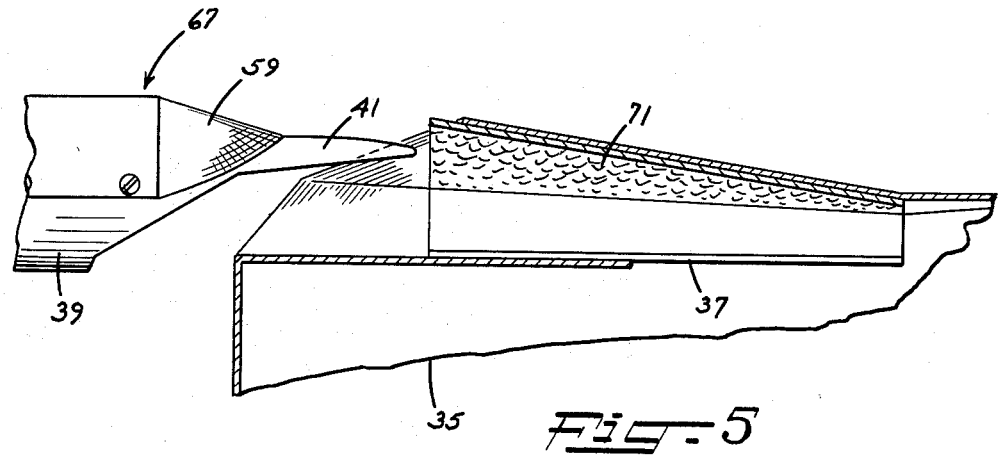
FIGURE 5 is a vertical section through the valve portion of the bag shown in FIGURE 2 just prior to sealing thereof.
Figure 6:
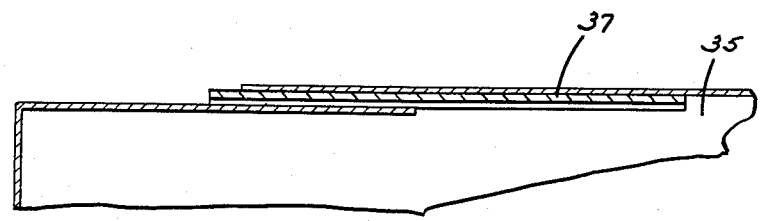
FIGURE 6 is a view similar to FIGURE 5 showing the bag valve in a sealed condition.

As best seen in FIGURE 2, the inclined relationship of the screen 59 serves to direct the adhesive bubbles 69 toward the adjacent portions of the bag sleeve 37, thus providing a layer 71 of adhesive bubbles thereon as the bag 35 is being continuously withdrawn from the member 67. Pumping of the tacky film-forming material through the pipe 55 is stopped as the left end of the bag sleeve 37, as viewed in FIGURE 2, approaches the screen opening of the conduit 51, with the delivery of the compressed air being stopped shortly thereafter. This procedure serves to reduce the amount of tacky film-forming material within the porous plug 57 and thus minimizes escape of the same after the adhesive bubble forming operation is completed. After the bag 35 is removed from the member 67, as shown in FIGURE 5, the filled bag is tilted onto its right side, as viewed in FIGURE 5, whereby the packaged material shifts therein to close the bag valve, as in conventional valve bag filling operations. As the opposite portions of the bag sleeve 37 are pressed together, the adhesive bubbles and layer 71 are distorted into flattened positions and ultimately ruptured, as heretofore described with reference to FIGURE 1, to thus provide a generally uniform and unbroken adhesive coating therebetween.

In the operation of the above described apparatus, the compressed air may be delivered to the plug 57 as a steady stream or as a rapidly pulsating flow. The positions and number of gas delivery pipes 65 may, of course, be varied to suit particular operating conditions. Further, a suitable coating can be applied to the top surface of the overhanging lip 41 of the filling spout 39 to prevent adherence of the tacky film-forming material thereto.

Various changes and modifications may be made in practicing the invention without departing from the spirit and scope thereof, and, therefore, the invention is not to be limited except as defined in the appended claims.

We claim:

1. Apparatus for applying adhesive including means for providing tacky film-forming material, means for breaking said tacky film-forming material into individual masses, and means for expanding and discharging said individual masses as a plurality of bubbles of tacky film-forming material.

2. Apparatus for applying adhesive including a porous means, means for delivering a tacky film-forming material to said porous means, and means for passing a gaseous medium into said porous means to urge said film-forming material therethrough as a plurality of individual masses and to inflate the same into a plurality of bubbles of tacky film-forming material.

3. Apparatus for applying adhesive including a container for tacky film-forming material, porous means positioned within an open end of said container for dispersing the tacky film-forming material into a plurality of individual masses as it passes therethrough, and means for delivering a gaseous medium into said porous means to urge the tacky film-forming material therethrough and to inflate the individual masses thereof into a plurality of bubbles of tacky film-forming material.

4. Apparatus for applying adhesive including a tubular member, porous means positioned within one end of said tubular member, means at the opposite end of said tubular member for supplying tacky film-forming material thereto and at least one pipe extending through said opposite end of said container and terminating at least adjacent to said porous means for delivering a gaseous medium, whereby the tacky film-forming material is urged through the porous means as a plurality of individual masses and inflated into a mass of bubbles of tacky film-forming material.

5. Apparatus as defined in claim 4 wherein said porous means includes a mass of non-woven interlocking fibers, and a screen extending across the open end of said tubular member.

6. Apparatus as defined in claim 4 wherein said porous means includes a material having a plurality of interconnected voids, and a screen extending across the open end of said tubular member.

7. Apparatus as defined in claim 4 wherein said pipe terminates within said porous means.

8. In a valve bag filling machine the combination comprising a filling spout adapted to be inserted into the valve opening of a valve bag, means for delivering a material to be packaged to and through said filling spout, a conduit opening along an outer surface of said spout, means for supplying tacky film-forming material to said conduit, and means for discharging the tacky film-forming material from said conduit as a mass of expanded bubbles.

9. In a valve bag filling machine the combination comprising a filling spout adapted to be inserted into the valve opening of a valve bag, means for delivering a material to be packaged to and through said filling spout, a conduit extending along the periphery of said spout for containing tacky film-forming material, porous means disposed within the end of said conduit adjacent to the discharge end of said spout, means for supplying tacky film-forming material to said conduit, and means for delivering a gaseous medium to said porous means for urging tacky film-forming material therethrough as individual masses and for inflating the same into a plurality of bubbles of tacky film-forming material.

10. Apparatus as defined in claim 9 wherein the discharge end of said conduit terminates at a location spaced from the discharge end of said spout and extends along a plane inclined at an acute angle with respect to the adjacent surface of said spout whereby the plurality of bubbles are directed away from the conduit as they issue therefrom.

11. Apparatus as defined in claim 9 wherein said porous means includes a screen disposed across the open end of said conduit and said means for delivering said gaseous medium includes at least one supply pipe which terminates within said porous means.

12. In a valve bag filling machine the combination comprising a filling spout adapted to be inserted into the valve opening of a valve bag, means for delivering a material to be packaged to and through said filling spout, a conduit opening along the outer periphery of said spout for containing tacky film-forming material, means for supplying tacky film-forming material to said conduit, means for breaking the tacky film-forming material into individual masses as it is discharged from said conduit and means for inflating said individual masses of tacky film-forming material into a bubble form.

References Cited by the Examiner

UNITED STATES PATENTS

| 2,907,153 | 10/59 | Toles | 53—383 X |
| 3,097,584 | 7/63 | Wright | 118—266 X |

FOREIGN PATENTS 457,419  11/36  Great Britain.

FRANK E. BAILEY, *Primary Examiner.*

TRAVIS S. McGEHEE, *Examiner.*